July 10, 1934. W. C. STARKEY 1,966,267
SPRING CLUTCH
Filed April 4, 1931
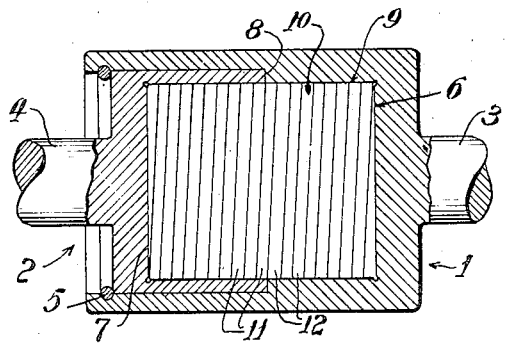
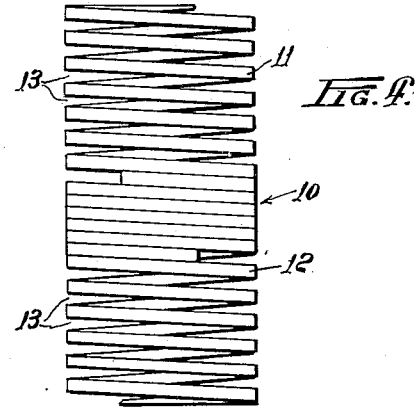
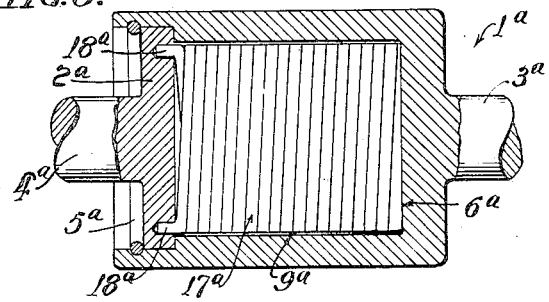
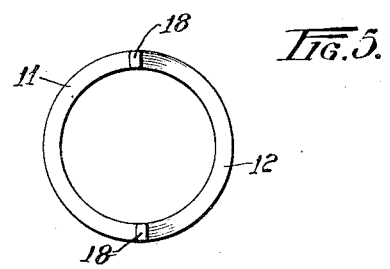
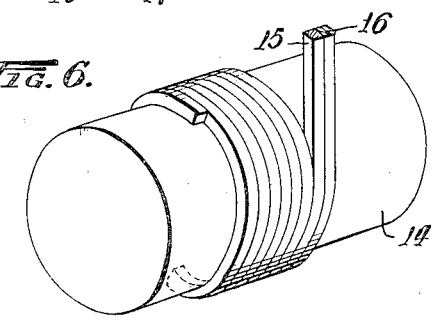
Inventor:
William C. Starkey,
By: Arthur W. Nelson
Atty.

Patented July 10, 1934

1,966,267

UNITED STATES PATENT OFFICE 1,966,267

SPRING CLUTCH

William Carleton Starkey, Indianapolis, Ind., assignor to L. G. S. Devices Corporation, Indianapolis, Ind., a corporation of Indiana Application April 4, 1931, Serial No. 527,661

2 Claims. (Cl. 192—41)

This invention relates to improvements in spring clutches and it consists of the matters hereinafter described and more particularly pointed out in the appended claims.

The spring clutch with which my invention is more particularly concerned is of the kind including two relatively rotatable axial members formed to provide a pocket to receive a clutching spring, which upon a relative rotation of said members in one direction, changes its diameter to clutch said two members together.

Heretofore, only a single close wound clutching spring was employed in the pocket so that only a single turn thereof crossed the plane of the meeting ends of said members, and it is in this plane where the greatest strain is imposed upon the spring.

One of the objects of the present invention is to provide a clutch spring structure wherein the holding pressure is better equalized and distributed at said plane of said meeting ends of said members.

A further object of the invention is to provide a spring structure for this type of clutch having a greater safety factor in that, should a certain spring turn break, other turns are operative to take up the holding pressure lost by the breaking of said first mentioned turn.

Still a further object of the invention is to provide a multiple spring for use in a clutch of this kind comprising a plurality of interengaged helical coil springs thus materially increasing the strength and durability of the same without increasing its length.

These objects of the invention as well as others, together with the many advantages thereof, will more fully appear as I proceed with my specification.

In the drawing:—

Fig. 1 is a longitudinal vertical sectional view through a simple conventional type of spring clutch embodying my invention, and wherein the clutch spring structure is radially oversize with respect to its associated recess or pocket.

Fig. 2 is a view similar to Fig. 1 and illustrates a modified form of the invention wherein the spring structure is undersized with reference to its associated pocket and is provided at one end with energizing means.

Fig. 3 is a view similar to Fig. 1 and illustrates a further modified form of the invention.

Fig. 4 is a view illustrating the manner in which a plurality of individual helical coiled springs may be interengaged to provide the improved spring structure for a clutch of this kind.

Fig. 5 illustrates an end view of one form of spring structure which will be more fully referred to later, and Fig. 6 is a detail perspective view illustrating a further manner in which the spring structure may be made.

Referring now in detail to that embodiment of the invention illustrated in the accompanying drawing and especially to Fig. 1 thereof, the reference numerals 1 and 2 are applied respectively to coacting cup-like clutch members formed on the ends of coaxial, associated shafts 3 and 4 respectively. One end of the cup member 1 is made to receive rotatively the other cup member 2 and a spring ring 5 acts to hold said members against endwise separation. The cup members 1 and 2 are provided with axial recesses or pockets 6 and 7 respectively that meet in a plane as indicated at 8 to form a cylindrical clutch spring recess or pocket 9.

In the pocket 9 is mounted a spring structure 10 which is slightly radially oversize with respect to the pocket and is made up of a plurality of interengaged, helical coiled springs 11 and 12 of the same length as best shown in Fig. 4. In said Fig. 4 the said springs are shown as being interengaged by screwing one spring into the other, and therefore, it is apparent, that each spring is an open wound spring and the helical space 13 of each spring is of an axial width to receive the turns of the other spring. In this respect, it is pointed out that the thickness and depth of the stock from which the springs 11 and 12 are originally made may have those dimensions best adapted to meet the conditions under which the finished spring structure as a whole is employed. It is also pointed out that instead of threading only one spring into another, any number of such springs may be interengaged within reason, it being apparent that in the winding of such springs, the helical spaces between the turns thereof must be of that dimension to receive the desired number of interengaged springs.

Instead of forming each spring individually and then screwing or threading them together to provide the interengaged structure as just above described, I may form the spring structure by simultaneously winding the desired number of lengths of spring stock upon an arbor 14 as shown in Fig. 6, wherein two lengths 15 and 16 of spring stock arranged side by side are illustrated as being wound upon said arbor 14.

When a spring structure 10, made in either manner above described is disposed in the pocket 9 as shown in Fig. 1, it is apparent that more than one spring turn traverses or crosses the plane of the effective meeting ends 8 of the cup members. Upon a relative movement between said members in one direction the spring structure 10 comprising the interengaged springs 11 and 12 will radially expand and will engage the cylindrical wall of the pocket 9 to clutch operatively the two members 1 and 2 together.

In Fig. 2 is illustrated a modified form of construction wherein parts similar to those in Fig. 1, bear the same reference numerals. In the chamber 9 thereof is employed a spring structure 17, which is of such a normal diameter as to have a clearance with respect to the cylindrical wall of the chamber 9. With such a spring structure the same end of both of the interengaged springs are bent to form axially extending toes 18 for anchoring in recesses provided therefor in the member 2. This arrangement of the toes is best shown in Fig. 5. When only two springs are interengaged, these toes are spaced opposite each other but when more springs are thus employed, said toes are spaced at equal arcuate points according to the number of springs interengaged. Connected to the other end of each spring is a more flexible energizing spring 19. These springs are preferably made of stock of a smaller cross sectional area than the springs of the spring structure 17 but are preferably of the same outside diameter. The free ends of the energizing springs engage yieldably the end wall of the cup member 1 so that the energizing springs, together with the main springs of the spring structure 17, are unwound or expanded into clutched relation with the clutch members 1 and 2 or are wound into an inoperative position depending upon the direction of rotation of the cup member 1 relatively to the member 2.

In a relative rotation between said members 1 and 2 in the proper direction, the energizing springs 19 first grip the member 1 and in the further relative rotation in said direction, these springs will pick up and energize the interengaged springs 17 from the associated end and will cause them to expand radially and clutch against the cylindrical surface of the pocket 9 so that the two members 1 and 2 are clutched together. In this arrangement as in Fig. 1, a number of spring turns will traverse or cross the plane of the meeting ends 8 and this number will equal the number of springs interengaged. A structure of this kind gives a quick, sensitive clutching action with but a light overrun if any, between the spring 17 and member 1 upon a proper rotational movement of said member.

In Fig. 3 is illustrated a further modified form of arrangement wherein a cup-like member 1ª on a shaft 3ª is provided with a recess or pocket 9ª that is closed by a disc 2ª on a shaft 4ª, a spring ring 5ª locking said member and disc against relative endwise separation but permitting a relative rotation between them. Thus the cup member and disc provide a pocket 9ª that receives a spring structure 17ª. Such a spring structure comprising a plurality of interengaged springs, is slightly undersize in outside diameter with respect to the cylindrical wall of the pocket and the same end of each of the interengaged springs is formed to provide a toe 18ª for anchoring in the disc 2ª. The ends of the inter-engaged springs opposite the toes 18ª bear yieldingly against the end wall of the clutch member 1ª so that the springs are expanded or contracted with the side wall member 1ª depending upon the direction of rotation of the member 1 relatively to the disc 2ª.

In a relative rotative movement in the proper direction between said cup member and disc, said spring structure is free from connection with respect to the member 1ª as it has no toe connection. When said cup member and disc are relatively rotated in the proper direction, said interengaged spring structure is caused to expand throughout its length from that end associated with the member 1 so as to clutch against the cylindrical surface of the pocket 9ª.

It is apparent that in such an interengaged spring structure, the load thereon when operating with a clutching action is more evenly distributed so that the strain or stress is not imposed upon any single turn of any one spring so interengaged. Such a structure is of especial advantage in clutches wherein two cup-like members are employed because a plurality of turns corresponding to the number of coils interengaged will cross the plane of the meeting ends of said cup members; it being in said plane when the greatest stress is imposed upon a spring when used in a clutch of this kind. Thus even though one of the interengaged springs break in said plane, the remainder will assume and hold the increased load imposed thereupon. In this manner an increased safety factor is obtained.

While in describing the invention, I have referred in detail to the form, arrangement and construction of the parts thereof, the same is to be considered merely as illustrative so that I do not wish to be limited thereto except as may be specifically set forth in the appended claims.

I claim as my invention:—

1. A spring clutch of the character described, comprising in combination two complemental, rotatably mounted, cup-shaped clutch members arranged one opposite the other and so that the open ends thereof meet one another, and forming together a cylindrical chamber, and a plurality of coextensive, interengaged, helical clutch springs disposed in, and longitudinally of, the chamber and having the coils thereof engaging one another throughout their entire length, said springs being arranged with respect to the two clutch members so that in response to one-way rotation of one of the clutch members relatively to the other they are expanded into a position wherein the coils thereof clutch outwardly against the side walls of the members and lock the members together for conjoint rotation as well as provide a plurality of spring turns crossing the plane of the meeting ends of the members at equidistantly spaced points, and in response to reverse rotation of said one clutch member relatively to the other, they are subjected to a winding force in the chamber and release said one clutch member for rotation independently of the other member.

2. A spring clutch of the character described, comprising in combination two complemental, rotatably mounted, cup-shaped clutch members, arranged one opposite the other and so that the open ends thereof meet one another, and forming together a cylindrical chamber, and a pair of coextensive, interengaged, helical clutch springs disposed in, and longitudinally of, the chamber and having the coils thereof engaging one another throughout their entire length, said springs having cylindrical outer peripheries and being anchored at one end thereof to the end wall of the adjacent cup-shaped clutch member and being arranged so that in response to one way rotation of one of the clutch members relatively to the other they are expanded into a position wherein the coils thereof clutch outwardly against the side walls of the members and lock the members together for conjoint rotation as well as provide a plurality of spring turns crossing the plane of the meeting ends of the members at equidistantly spaced points, and in response to reverse rotation of said one clutch member relatively to the other, they are subjected to a winding force in the chamber and release said one clutch member for rotation independently of the other member.

WILLIAM CARLETON STARKEY.